United States Patent
Knepper et al.

(10) Patent No.: US 6,767,497 B2
(45) Date of Patent: Jul. 27, 2004

(54) ROBOTIC PARISON HANDLING METHOD AND APPARATUS

(75) Inventors: Carl L Knepper, Troy, OH (US); David P. Meiring, Troy, OH (US)

(73) Assignee: Wentworth Mold, Inc., Electra Form Industries Division, Vandalia, OH (US)

( * ) Notice: Subject to any disclaimer, the term of this patent is extended or adjusted under 35 U.S.C. 154(b) by 259 days.

(21) Appl. No.: 09/991,355

(22) Filed: Nov. 20, 2001

(65) Prior Publication Data
US 2003/0094733 A1 May 22, 2003

(51) Int. Cl.$^7$ ............................................. B29C 45/42
(52) U.S. Cl. ..................... 264/334; 425/556; 425/444; 425/DIG. 5
(58) Field of Search ..................... 264/334; 425/443, 425/556, 444, 572, DIG. 5

(56) References Cited

U.S. PATENT DOCUMENTS

| | | | |
|---|---|---|---|
| 3,264,684 A | * | 8/1966 | Moslo .................... 425/DIG. 5 |
| 4,102,626 A | | 7/1978 | Scharrenbroich ........... 425/526 |
| 4,571,171 A | * | 2/1986 | Blank et al. ................. 425/150 |
| 4,634,366 A | * | 1/1987 | Brun et al. .................. 425/526 |
| 4,729,732 A | | 3/1988 | Schad et al. ................. 425/526 |
| 4,793,960 A | | 12/1988 | Schad et al. ................. 264/535 |
| 5,051,227 A | * | 9/1991 | Brun et al. .................. 264/537 |
| 5,447,426 A | | 9/1995 | Gessner et al. ............. 425/526 |
| 5,531,588 A | | 7/1996 | Brun, Jr. et al. ............ 425/556 |
| 5,643,620 A | * | 7/1997 | Brun, Jr. ..................... 425/556 |
| 5,702,734 A | | 12/1997 | Hartman et al. ............. 425/534 |
| 5,720,915 A | * | 2/1998 | Joppen et al. ............... 264/321 |
| 5,855,932 A | | 1/1999 | Bright et al. ................. 425/444 |
| 6,126,429 A | * | 10/2000 | Burger et al. ................ 425/169 |
| 6,190,157 B1 | | 2/2001 | Hofstetter et al. .......... 425/526 |
| 6,315,543 B1 | | 11/2001 | Lausenhammer et al. | 
| 6,332,769 B1 | * | 12/2001 | Bashor et al. ............... 425/388 |
| 6,382,954 B1 | | 5/2002 | Mai | 
| 6,391,244 B1 | | 5/2002 | Chen |
| 6,416,312 B1 | * | 7/2002 | Gonser et al. .......... 425/DIG. 5 |
| 6,461,141 B1 | | 10/2002 | Harrison et al. |

FOREIGN PATENT DOCUMENTS

| | | | |
|---|---|---|---|
| EP | 0 700770 A2 | 7/1995 | ........... B29C/49/64 |
| GB | 1024132 | 10/1962 | |

* cited by examiner

Primary Examiner—Jill L. Heitbrink
(74) Attorney, Agent, or Firm—Brinks Hofer Gilson Lione

(57) ABSTRACT

A release mechanism operating to release molded articles from a third mold portion includes a guide coupled to the second mold portion forming a cam track. A cam follower coupled to the surfaces of the third mold portion, which are holding the molded articles, is engaged in the cam track when the second and third mold portions are within a pre-selected distance of each other. The cam follower interacts with the cam track to cause some initial movement of the surfaces holding the molded articles to a pre-release position for the holding surfaces so that the molded articles are loosely retained by the holding surfaces. A power operator, carried by the third mold portion and coupled to the article holding surfaces, is responsive to a signal to move the article holding surfaces from the pre-release position to a full release position when a molded article receiver is suitably positioned to receive the molded articles. The molded article receiver includes receiver tubes for receiving the molded articles. The receiver tubes have an open forward end configured to receive a molded article, a closed rearward end including a surface contact element movably situated with respect to the forward end. The surface contact element is configured to conform to a portion of the surface of the molded article. A vacuum duct couples the closed rearward end to a source of vacuum for assisting in the retention of the molded articles within the receiver tubes. An air cylinder is coupled to each surface contact element, and a pressure duct couples to each air cylinder to a source of air pressure for controlling the position of the surface contact element with respect to the forward end of the receiving tube.

19 Claims, 6 Drawing Sheets

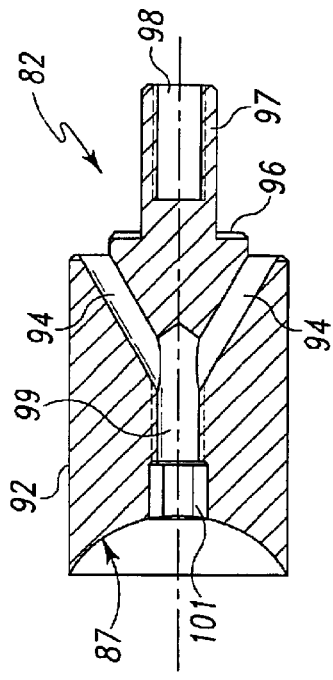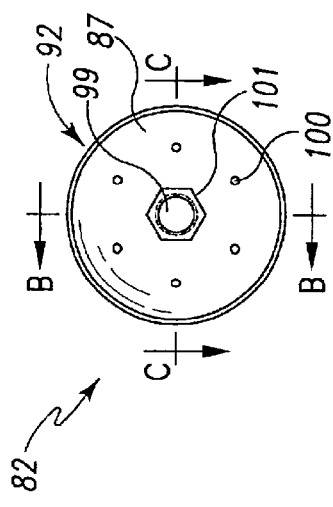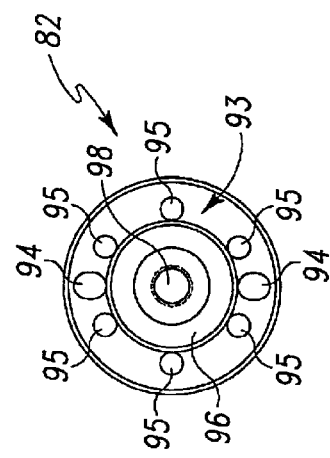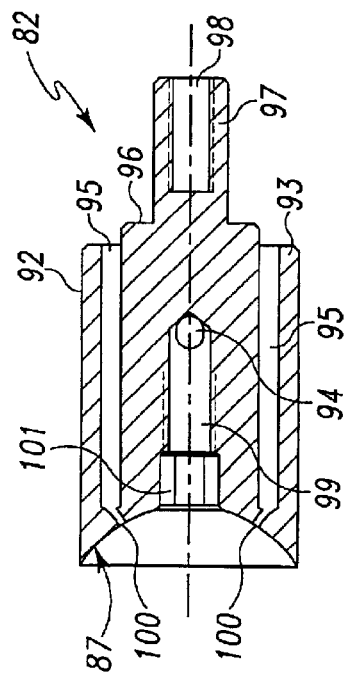
Fig. 6A
Fig. 6B
Fig. 6C
Fig. 6D

ROBOTIC PARISON HANDLING METHOD AND APPARATUS

BACKGROUND OF THE INVENTION

The present invention is directed generally to molds for use in injection molding machines and to related apparatus used in conjunction with the molds to process articles produced in the molds. The invention pertains to the operation of elements for causing relative movement of some portions of the molds with respect to other portions, particularly in conjunction with the motion of the related molded article processing apparatus. The present invention is more particularly related to such apparatus for use in three portion molds consisting essentially of a mold cavity assembly, a mold core assembly and an intermediate assembly including space surface defining elements that cooperate with the mold core and cavity assemblies to define the space in which articles are molded of plastic, the apparatus regulating the movement of the space surface defining elements during movement of the intermediate assembly relative to the other portions of the mold and relative to the related molded article processing apparatus. The invention has particular utility in a molding operation in which the related molded article processing apparatus comprises a molded article receiver unit designed to enter into an interval or opening between the mold cavity assembly and the other mold assemblies subsequent to formation of the molded article. Of particular interest is the controlled positioning and/or timing of release of the molded article from the intermediate assembly into the molded article receiver unit.

Brun, Jr., et al., U.S. Pat. No. 5,531,588 discloses an adjustable cam track for a mold having a mold cavity assembly, a mold core assembly that is movable relative to the mold cavity assembly, and a stripper assembly movably interposed between the mold core and cavity assemblies. The stripper assembly has at least one pair of space defining surfaces that together with the mold cavity and core assemblies, defines at least one space for receiving plastic material injected therein to form at least one molded article. The mold core assembly and the stripper assembly can be moved away as a coupled pair from the mold cavity assembly to remove the at least one molded article from the mold cavity assembly. The mold core assembly and the stripper assembly are then separated to remove the at least one molded article from the mold core assembly. The adjustable cam track of Brun, Jr., et al., includes a guide fixed to the stripper assembly. A cam follower is coupled to the space defining surfaces of the stripper assembly platen and is engaged in the adjustable cam track so that movement of the cam follower causes movement of each pair of space defining surfaces relative to each other to release the molded article from the molding machine. The adjustable a cam track also includes a cam insert that is adjustably positionable with respect to the guide to adjust the point of release of the molded article. The cam insert includes a first toothed rack, and a second toothed rack removably fixed to the guide and engaging the first toothed rack to fix the position of the cam insert relative to the guide only at certain preselected locations.

The previously described adjustable cam track of Brun, Jr., et al., has been used in the manufacture of parisons for containers at rates that required special handling of the parisons upon their removal from the mold core assembly. This special handling was accomplished with a molded article receiver assembly that was movable into the interval between the mold cavity assembly and the mold core assembly when the mold was in an open position such as that disclosed in Delfer III, U.S. Pat. No. 4,721,452. Ideally, the position of the molded article receiver assembly was such that movement of the stripper assembly relative to the mold core assembly inserted the parisons into the molded article receiver assembly. This was followed immediately by the release of the parisons by the pair of space defining surfaces, which only occurred when the parisons were properly located in the molded article receiver assembly. However, as a practical matter, even slight misalignment between the mold core assembly and the molded article receiver assembly caused one or more of the parisons to be significantly damaged as they were inserted into the molded article receiver assembly. Furthermore, since release of the parisons was related only to the relative position of the stripper assembly relative to the mold core assembly, is was also necessary to accurately position the molded article receiver assembly and coordinate the timing of such positioning so that as little damage as possible occurred. While substantial efforts were focused on insuring the proper alignment between the mold core assembly and the molded article receiver assembly during the movement of the stripper assembly, this did not always accomplish the desired end.

In co-pending U.S. application Ser. No. 09/726,743, filed Nov. 30, 2000 and assigned to the same assignee, an adjustable cam track is disclosed that includes a guide coupled to a mold core assembly, the guide defining a first portion of the adjustable cam track. A cam follower is engaged in the cam track and is coupled to the space defining surfaces carried by the stripper assembly for causing relative movement of each pair of space defining surfaces as the stripper assembly moves relative to the mold core assembly. The cam follower is engaged in the first portion of the cam track when the mold portions are in the closed position. The first portion of the cam track also includes a ramp to an intermediate portion defining the prerelease position of each pair of space defining surfaces so that the molded article is loosely retained by the space defining surfaces. This loose retention accommodates for any small amount of misalignment between the molded article receiver assembly during the transfer of the molded articles from the stripper assembly to the molded article receiver assembly. The adjustable cam track of the co-pending application also includes a cam insert defining a second portion of the adjustable cam track. The path defined by the cam insert is generally a matter of choice of design except that it defines the point of release of the molded article from the space defining surfaces. The cam insert is adjustably positionable with respect to the guide to adjust the point of release with respect to the ramp defining the onset of prerelease, thereby permitting the adaptation of the cam track to molded articles of a variety of sizes. However this adjustment of position of the cam insert is one made to generally coordinate the position of the release, but is not responsive to the timing of the achievement of the specified position by the molded article receiver apparatus.

It is therefore desirable that each pair of space defining surfaces of the stripper assembly be allowed to separate slightly, but not entirely, from the molded articles so that the molded articles are only loosely retained in a prerelease position. This prerelease position allows some play in the position of the molded articles relative to the stripper assembly thus permitting some variation in position of the molded article receiver assembly at the time of introduction of the molded articles. Due to the variation in length of the molded articles, it is also desirable to modify or adjust the position of product release from the stripper assembly in relation to the position of onset of the prerelease position. It is also desirable for the product release from the stripper assembly to occur in response to an indication of the attainment of a specified position by the molded article receiver assembly.

SUMMARY OF THE INVENTION

Accordingly, an article molding assembly of the present invention includes a mold and a release mechanism for releasing molded articles from the mold. The mold includes a first mold portion, a second mold portion that is movable with respect to the first mold portion, and a third mold portion. The third mold portion is movably interposed between the first and second portions and has at least one pair of space defining surfaces which, together with the first and second mold portions, defines in a closed position at least one space for receiving plastic material injected therein to form one or more molded articles. The second and the third mold portions are movable away from the first mold portion to permit removal of the molded articles from the first mold portion. The second mold portion is also movable away from the third mold portion to remove the molded articles from the second mold portion. The release mechanism operates to release the molded articles from the third mold portion. In an embodiment of particular interest, the first mold portion is a mold cavity plate including a plurality of cavities and the second mold portion is a mold core plate supporting a like plurality of cores adapted to inserted into the cavities when the mold is in a closed position. The third mold portion is a stripper plate that supports a like plurality of sets of engaging elements such as thread splits. The thread splits or other similar elements function, in conjunction with the core and cavity portions of the mold, to define the spaces into which plastic can be injected to form the articles having a desired configuration. The release mechanism acts to release the molded articles from the thread splits or similar article engaging elements, generally into a cooling mechanism that will complete the cooling cycle needed for the formation of the molded articles, thereby shortening the residence time of the molded articles in the mold subsequent to injection.

The release mechanism of the present invention includes a guide coupled to the second mold portion. The guide controls the relative position of the sets of space defining surfaces that, together with a first and second mold portions, define in the closed position the space for receiving injected plastic material to form the molded articles. The guide generally includes a first portion having a closed end and including a pair of inner sides confronting each other to define a cam track. The inner sides in the first portion are spaced sufficiently from each other to accommodate a cam follower that is closely received between the inner sides when the mold portions are in the closed position. The first portion can also include a ramp leading to an intermediate portion. The intermediate portion functions to define a pre-release position for the pairs of space defining surfaces so that the molded articles are loosely retained by the space defining surfaces. In a preferred embodiment, one of the inner sides in the intermediate portion is inclined away from the other inner side thus expanding the space that can be occupied by the cam follower toward a second portion. The second portion includes an open end so that the cam follower can move outside the space between the inner sides of the cam track. Further, the inclined away inner surface is adapted to contact the cam follower as the third mold portion moves from the full release position toward the second mold portion. The cam follower then travels along the inclined away inner surface to return the space defining surfaces to a closed position.

As has already been indicated, a cam follower that is coupled to the sets of space defining surfaces of the third mold portion is engaged in the cam track when the second and third mold portions are within a pre-selected distance of each other. The cam follower interacts with the inner surfaces of the cam track to cause relative movement of the sets of space defining surfaces. The cam follower is generally closely engaged in the first portion of the cam track when the mold portions are in the closed position. The cam follower can be less closely engaged in the intermediate portion defining the pre-release position of the sets of space defining surfaces. The cam follower can be completely outside the cam track defined by the confronting inner surfaces at the point of full release of the molded articles.

The release is achieved by a power operator, such as a fluid operated cylinder, solenoid, or other similar device carried by the third mold portion and coupled to the space defining surfaces. The power operator is responsive to a signal to move the sets of space defining surfaces from the pre-release position to a full release position. In the preferred embodiment the signal is supplied by a molded article receiver in sufficiently close proximity to the third mold portion that the molded articles are transferred from the third mold portion to the molded article receiver at such time as the articles are released by the sets of space defining surfaces.

In a particularly desirable embodiment, the molded article receiver includes at least one corresponding receiver tube alignable with each set of space defining surfaces for receiving the molded article, and at least one sensor for detecting any deposition of a molded articles into a receiver tube, the sensor being coupled to a signal source for sending said signal to said power operator. In this embodiment the receiver tube can include an open forward end configured to receive a molded article and a closed rearward end having a surface contact element movably situated with respect to the forward end and configured to conform to a portion of the surface of the molded article. A vacuum duct couples to the closed rearward end of the receiver tube to a source of vacuum for assisting in the retention of a molded article within the receiver tube. An air cylinder is coupled to the surface contact element, and a pressure duct couples each air cylinder to a source of air pressure for controlling the position of the surface contact element with respect to the forward end of the receiver tube.

In the usual operation of an injection molding machine, molded articles are formed in a mold having a first mold portion, a second mold portion movable with respect to the first mold portion. In molding machines of particular interest to the present invention, a third mold portion is movably interposed between the first and second portions that has at least one pair of space defining surfaces for each space defined between the first and second mold portions for receiving plastic material to form molded articles. The second and the third mold portions generally are movable relative to the first mold portion to permit removal of the molded articles from the first mold portion. The second mold portion is movable relative to the third mold portion to permit removal of the molded articles from the second mold portion. When the second and third mold portions have moved as a unit sufficient distance to remove the molded articles from contact with the first mold portion and provide a gap between the first and second mold portions, a molded article receiver moves into proximity with the third mold portion. The present invention is directed toward removing the molded articles from the third mold portion and introducing the molded articles into the receiver for further treatment, generally cooling, without damaging the newly molded articles.

The release of the molded articles from the third mold portion into the molded article receiver is accomplished by providing a guide coupled to the second mold portion that forms a cam track. A cam follower is coupled to the pairs of space defining surfaces of the third mold portion, the cam follower engaging the cam track at least when the second and third mold portions are in a closed position as well as when second and third mold portions are within a preselected distance of each other. While the cam track and follower are engaged, the cam follower interacts with the cam track to cause relative movement of each pair of space defining surfaces. As the third mold moves toward the molded article receiver, the cam follower moves to a portion of the cam track including a ramp defining a pre-release position of each pair of space defining surfaces mounted to the third mold portion so that the molded articles are loosely retained by the space defining surfaces. In this loosely retained position, the articles can be inserted into appropriate receivers, such a receiving tubes, despite some amount of misalignment between the receivers and the molded articles. This has the advantage of reducing the amount of damage suffered by the newly molded articles and prevents any machine lock-up due to minor misalignment between the molded article receiver and the articles being held by the third portion of the mold. Additional insertion of the molded article into the molded article receiver is achieved by movement of the third mold portion even further away from the second mold portion, to a point where the cam is no longer captured in the cam track and no longer controls the position of the pairs of space defining surfaces.

Once the molded articles are at least partially received in the receiver elements or tubes of the molded article receiver through movement of the third mold portion away from the second mold portion, a signal is provided to a power operator carried by the third mold portion and coupled to the space defining surfaces. The signal causes the power operator to move each pair of space defining surfaces from the pre-release position toward a full release position for releasing the molded articles from the third mold portion into the molded article receiver. The signal can be provided by a proximity detector situated on the third mold portion that senses, for example, the position of the third mold portion in relation to either the second mold portion or preferably the molded article receiver. A signal can also be provided by a sensor situated on the molded article receiver that senses, for example, the position of the third mold portion or preferably any deposit of molded articles into a receiver tube of the molded article receiver. In any case, the sensor is generally coupled to a signal generator capable of sending a signal to the power operator situated on the third mold portion. Desirably, the signal causing the power operator to move the space defining surfaces on the third mold portion is generated before the molded articles are fully deposited into the receiver elements or tube of the molded article receiver. This has the advantage of preventing damage to the portion of the molded article being held by the space defining surfaces that might occur if completed positioning is required prior to release due to "bottoming out" of the molded article within the article receiver element or tube.

Further avoidance of damage caused by "bottoming out" can be achieved by providing within each receiver tube an open forward end configured to receive a molded article and a closed rearward end including a surface contact element movably situated with respect to the forward end. The surface contact element is configured to conform to a portion of the surface of the molded article, and to be easily moved away from the forward end by contact with a molded article as it is deposited within the tube. To assist in this rearward movement, the closed rearward end of the receiver tube is coupled to a source of vacuum. There is also an air cylinder coupled to the movable surface contact element, the air cylinder being provided with sufficient air pressure to bias the surface contact element toward the open forward end of the receiver tube. The vacuum coupled to the closed rearward end of the receiver tube is generally insufficient to overcome the bias provided to the surface contact element by the air pressure within the air cylinder when no molded article is present within the receiver tube. However, when a molded article is located within the receiver tube, the vacuum becomes enhanced and assists in locating a molded article within the receiver tube in contact with the surface contact element. This vacuum action had the advantage of centering the molded article within the receiving tube so that the spacing of the cooling tubes now controls the spacing of the molded articles, even though the article spacing may have varied from that dimension due to the loose holding arrangement between the molded articles and the pairs of space defining surfaces prior to insertion of the molded articles into the receiving tubes.

In a particularly desirable embodiment, the signal, which causes operation of the power operator on the third mold portion releasing the molded articles from the space defining surfaces, is provided said signal from the molded article receiver to said power operator to cause movement of each pair of space defining surfaces from the pre-release position to a full release position only after the molded article is in contact with the surface contact element. This ensures that the molded articles are suitably positioned to allow the vacuum to overcome the bias provided by the air pressure within the air cylinders so that the surface contact element and molded article are displaced toward the receiver tube closed end thus uncoupling the molded article from the third mold portion, usually causing a displacement of the molded article away from the plane generally defined by the third mold portion. The release of the molded articles from the space defining surfaces under operation of the vacuum is sufficiently gentle that the surfaces of the molded articles held by the space defining surfaces are not damaged during the release process.

After the molded articles are safely situated in the molded article receiver, the molded article receiver is withdrawn from the gap between the first and second mold portions. After a suitable lapse of time and after the molded article receiver is moved to a suitable location, the air cylinder is provided with sufficient air pressure to displace the surface contact element toward the open end with sufficient speed to eject the molded article from the receiver tube for further processing. Generally, subsequent to the release of the molded articles from the pairs of space defining surfaces, and at the same time that the molded article receiver is removed from the gap between the first and second mold portions, the third mold portion is moved back toward the second mold portion so that the cam follower re-enters the cam track. The cam track is provided with an inclined surface adapted to contact the cam follower as the third mold portion moves from the full release position toward the second mold portion. This contact between the cam follower and inclined surface of the cam track returns the space defining surfaces to a closed position. This operation has the advantage of ensuring the repeatability of the positioning of the space defining surfaces without requiring very highly calibrated power operators coupling the space defining surfaces to the third mold portion.

Other features and advantages of the present invention will become apparent to those skilled in the art upon consideration of the following description of the illustrated preferred embodiment shown in the accompanying figures showing the best mode of the present invention as understood by the inventors.

BRIEF DESCRIPTION OF THE DRAWINGS

FIGS. 6A–D are four views of a surface contact element suitable for use in tube of a molded article receiver shown in FIG. 5

DESCRIPTION OF PREFERRED EMBODIMENTS

Figure 1:
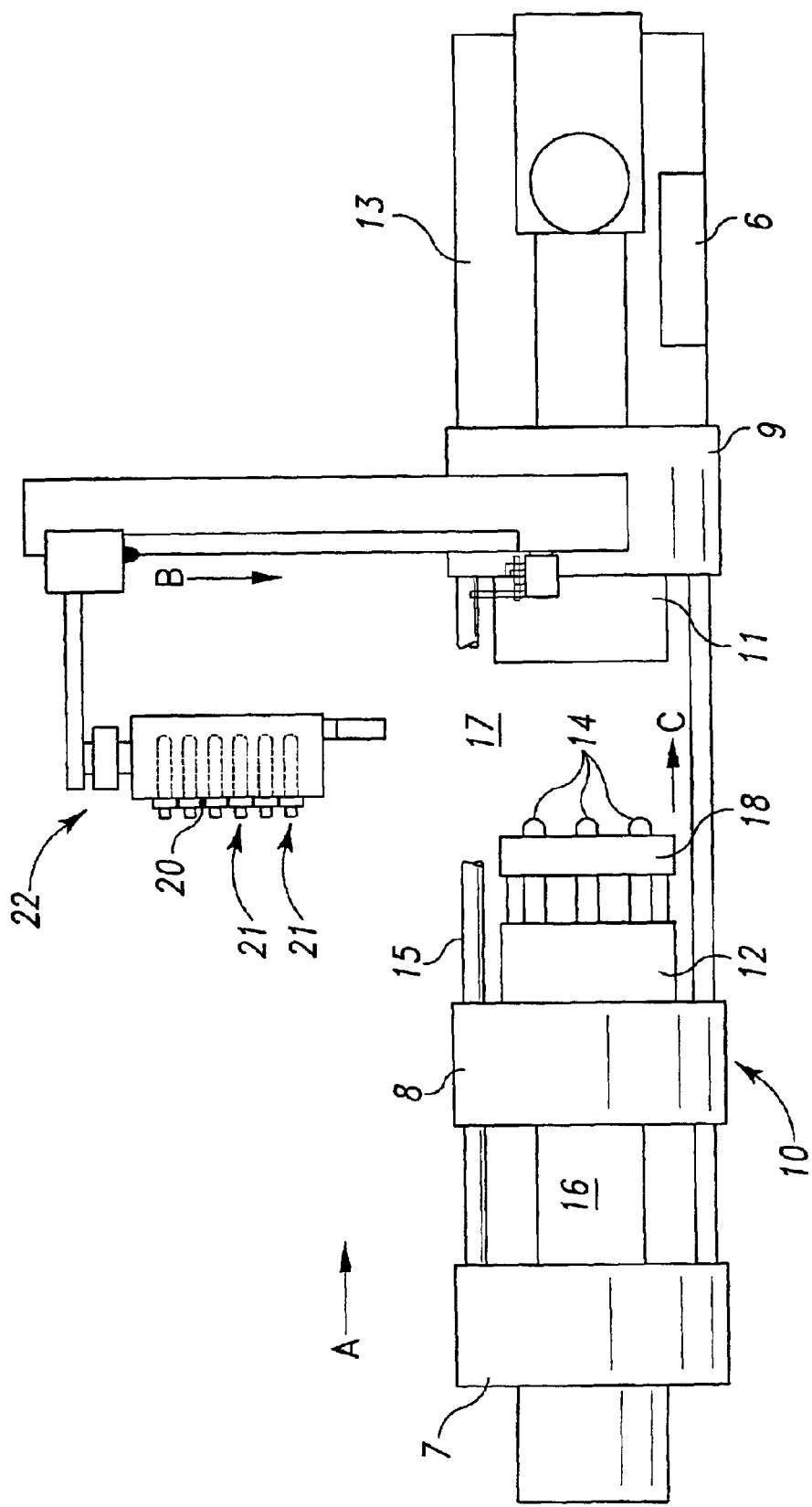
FIG. 1 is a schematic plan view of an injection molding machine including an article molding assembly of the present invention.

An injection molding machine 10 is shown in FIG. 1 to include an extruder 13 coupled to a fixed platen 9 and a movable platen 8 coupled to a clamping mechanism 7 including hydraulic cylinder 16. Tie rods 15 tie the fixed platen 9 to the clamping mechanism 7 and the movable platen 8 reciprocates on tie rods 15 relative to the fixed platen 9 in a cycle determined by a suitable control system 6 in a well known manner. A first mold portion 11, which contains a plurality of cavities, is coupled to the fixed platen 9. A second mold portion 12, which includes a like plurality of cores 14, the number of cores corresponding to the number of cavities, is coupled to the movable platen 8. A third mold portion 18 is situated between the first and second mold portions 11 and 12, and includes a plurality of pairs of space defining surfaces that surround each of the cores 14. The mold portions 11, 12 and 18 are shown in FIG. 1 in an "open" position. The second and third mold portions 12 and 18 are movable with the movable platen 8 in the direction A into engagement with the first mold portion 11 in a "closed" position to form a plurality of spaces for receiving molten plastic from the extruder 13 to form a plurality of plastic articles 21 by injection molding in the conventional manner. The number of articles 21 formed in an injection molding cycle will depend on the number of cavities and cores included in the mold portions 11 and 12.

Subsequent to the formation of the plastic articles 21 by the injection of molten plastic, the mold portions 12 and 18 move away from mold portion 11 and toward the illustrated "open" position together as a unit with the formed plastic articles 21 on cores 14. Retention of the plastic articles can be aided by shrinkage of the articles onto cores 14. When in the "open" position, an interval or gap 17 is created between the cavity mold portion 11 and the cores 14 that permits the insertion in the direction B of an article carrier plate 20 of a molded article retrieval apparatus 22. The article carrier plate 20 is moved into and out of the gap 17 between the mold portions 11 and 18 by a trolley system 19 that is coupled to the fixed platen 9. The article carrier plate 20 can be provided with one or more sets of receivers for receiving the molded plastic articles 21, each set of receivers being equal to the number of cores 14 on mold portion 12. Removal of the plastic articles 21 from cores 14 onto the article carrier plate 20 is accomplished by the movement of the third mold portion 18 in the direction C toward the interposed article carrier plate 20. During such movement, the pairs of space defining surfaces, which surround each of the cores 14 and engaging each of the molded articles, strips the molded articles from the cores and into the waiting receivers of the article carrier plate 20. To enhance the reliability of successful placement of the molded articles into the receivers of the article carrier plate 20 with the least likelihood of damage, the spacing of the pairs of space defining surfaces are controlled by a release mechanism of the present invention described below.

Figure 2:
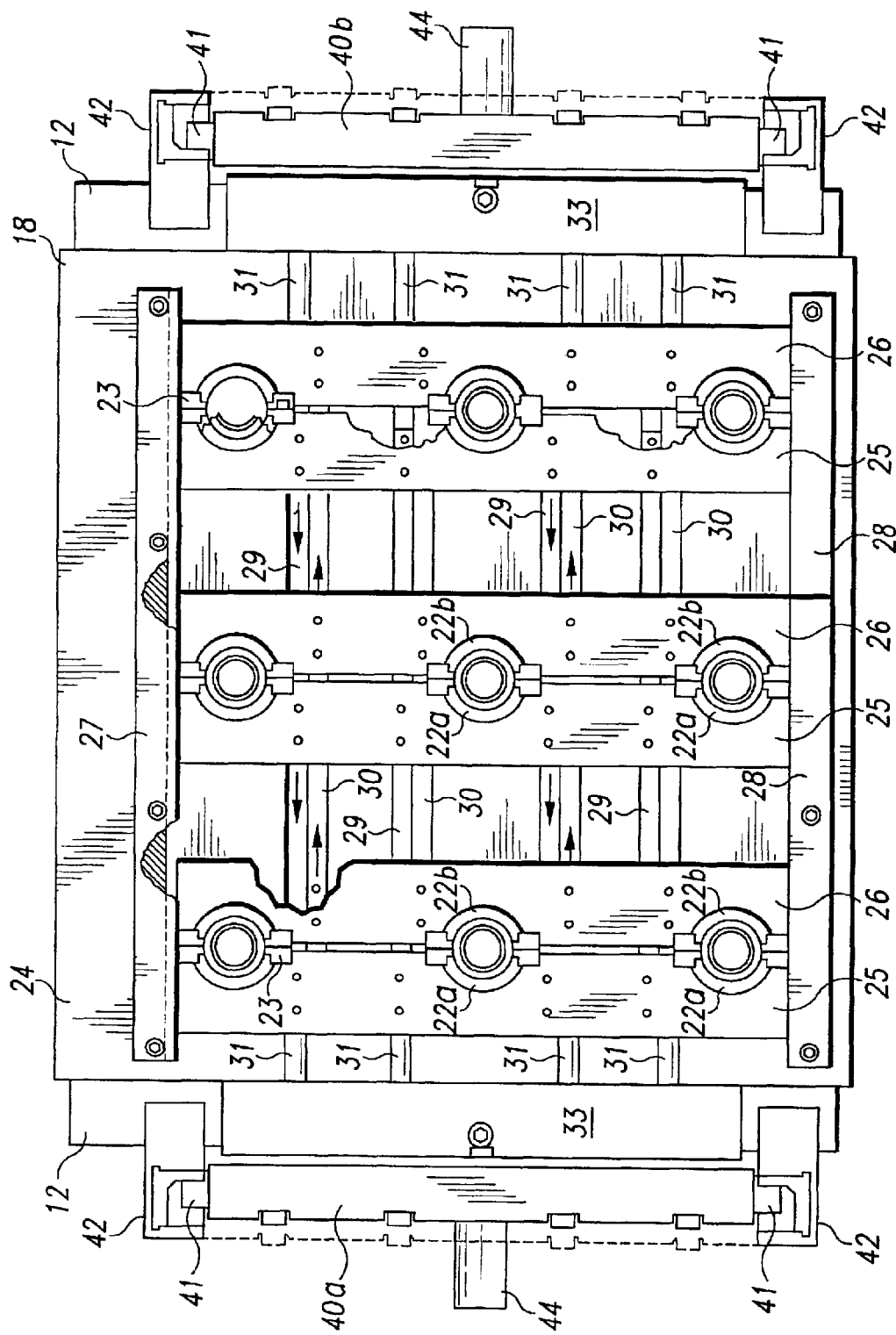
FIG. 2 is a front elevation view of a third mold portion including the power operators of the present invention partially broken away to show certain features and operation through phantom depiction.

FIG. 2 shows a face 24 of the third mold portion 18 that confronts the first mold portion 11. A plurality of pairs of space defining surfaces 22a and 22b, commonly known in the trade as "thread splits", are mounted to the face 24. The thread splits 22a and 22b cooperate with the cores 14 of the second mold portion 12 and the cavities of the first mold portion 11 to complete the definition of the spaces that receive the plastic from the injection extruder 13 to form the molded articles 21. The space defining surfaces 22a and 22b hold the articles 21 as they are stripped from the cores 14. Each half 22a and 22b of each of the thread splits is mounted to separate slides 25 and 26, respectively, by clamps 23. The slides 25 and 26 reciprocate laterally within channels defined by brackets 27 and 28 that are fixed to face 24 of the third mold portion 18. While FIG. 2 shows nine such sets of thread splits, it will be appreciated that the number of sets is a matter of choice of design and depends directly on the number of cores 14 on the first mold portion 12.

The slides 25 are secured together by tie members 29 while slides 26 are tied together by tie members 30 such that the lateral movement of all slides 25 or 26 is uniform and coordinated. The movement of all slides 25 is not directly coupled to the movement of all slides 26. A plurality of actuating rods 31 are fixed to the laterally outermost slides 25 and 26. The actuating rods 31 extend outward through blocks 33 that are coupled to the sides of third mold portion 18. The actuating rods 31 are coupled to movable actuating beams 40a and 40b located on either side of the third mold portion 18. Any lateral movement of slides 25 and tie members 29 is caused by corresponding movement of the actuating rods 31 and actuating beam 40a. Likewise, any lateral movement of slides 26 and tie members 30 is caused by corresponding movement of the actuating rods 31 and actuating beam 40b.

The actuating beams 40 can be moved by two independent means. A first means for moving the beams is a cam follower 41 fixed to each end of each beam 40. The cam followers 41 can be rollers or slides that are designed for interaction with a cam track 42 that is fixed to the second mold portion 12. A second means for moving the beams is a power operator 44 that is coupled between each beam 40 and block 33 fixed to the third mold portion 18. The power operator 44 can be any suitable mechanism that is capable of causing reciprocal motion of one of the beams 40 relative to the third mold portion 18, for example, a pneumatic or other fluid actuated cylinder and piston, a solenoid including a throw member, or a motorized pinion gear coupled to a rack.

Other suitable power operators will be apparent to those skilled in the art.

Figure 3:
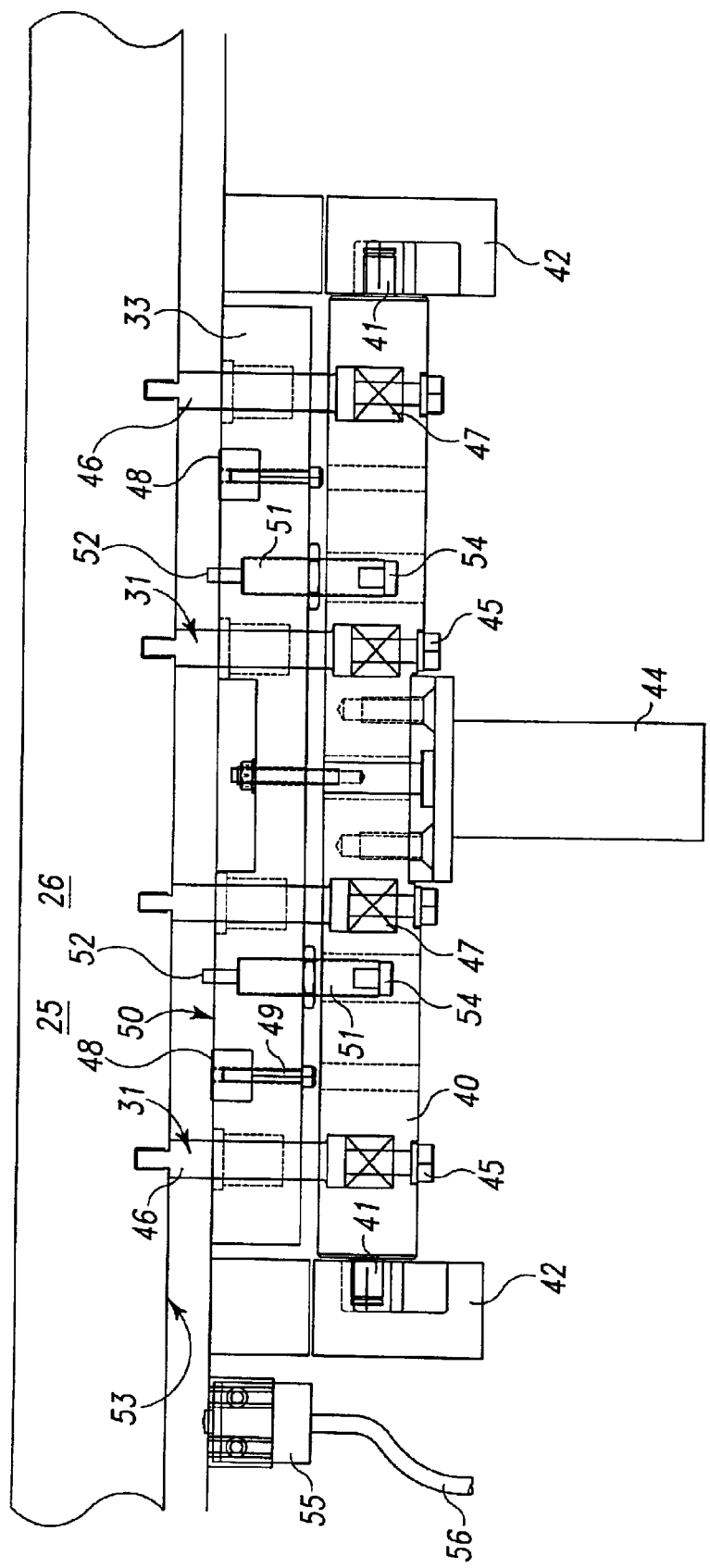
FIG. 3 is a detail view of one side of the third mold portion, cam follower and power operator shown in FIG. 2.

FIG. 3 illustrates a particularly preferred embodiment of the release mechanism of the present invention. Any dimensional changes between FIGS. 2 and 3 are merely to provide clarity of structure and operation, and neither Figure should be considered a scale drawing. Each of the actuating rods 31 are shown in FIG. 3 to be formed by a bolt 45 extending through beam 40 and block 33, the bolt 45 being secured to one of the outermost slides (either 25 or 26 depending on which side of the mold is being considered). Each bolt 45 is surrounded by a sleeve 46 that abuts the slide 25, 26. The sleeve 46 is movable relative to beam 40 and block 33. A compression spring 47 biases the sleeve 46 toward the slide 25, 26. The block 33 also includes a plurality of stops 48 held in recesses in the inside surface of the block by fasteners 49 so that a portion protrudes inward beyond the inner surface 50 of block 33. A plurality of shock absorbers 51 are also located in block 33 having movable plungers 52 that protrude toward the adjacent surface 53 of slides 25, 26. The shock absorbers 51 are threaded or otherwise secured into recesses in block 33, and have a rearward extension including an adjustment screw 54 for adjusting the resistance applied by the shock absorber. A sensor 55 senses the arrival of the slides 25, 26 in substantial contact with block 33. The sensor 55 can be any sort of electromechanical switch that is coupled to a suitable cable 56 leading to the control 6 for the molding machine 10 or other suitable control mechanism.

Any movement of the beam 40 away from block 33 results in a corresponding movement of the slides 25 or 26 to which the beam 40 is attached through actuating rods 31. As the slide 25 or 26 approaches block 33, it is initially slowed in its travel by contact with the plungers 52 of shock absorbers 51 and then stopped by the protruding stops 48. Any movement of the beam 40 back toward block 30 applies a force through compression spring 47 and sleeve 46 against surface 53 of beam 25, 26. In the absence of any resistance, the applied force is sufficient to cause a corresponding movement of the adjacent beam 25, 26 as well as the related beams connected thereto through slides 29 or 30 as shown in FIG. 2. In the event of some resistance (usually due to an incompletely released molded article or other mechanical obstruction) the travel provided by the sliding sleeve 46 and compression spring 47 allows the beam 40 to return toward the illustrated position without a corresponding movement of the slides 25, 26, thereby protecting the slides and related structures from physical damage.

Figure 4:
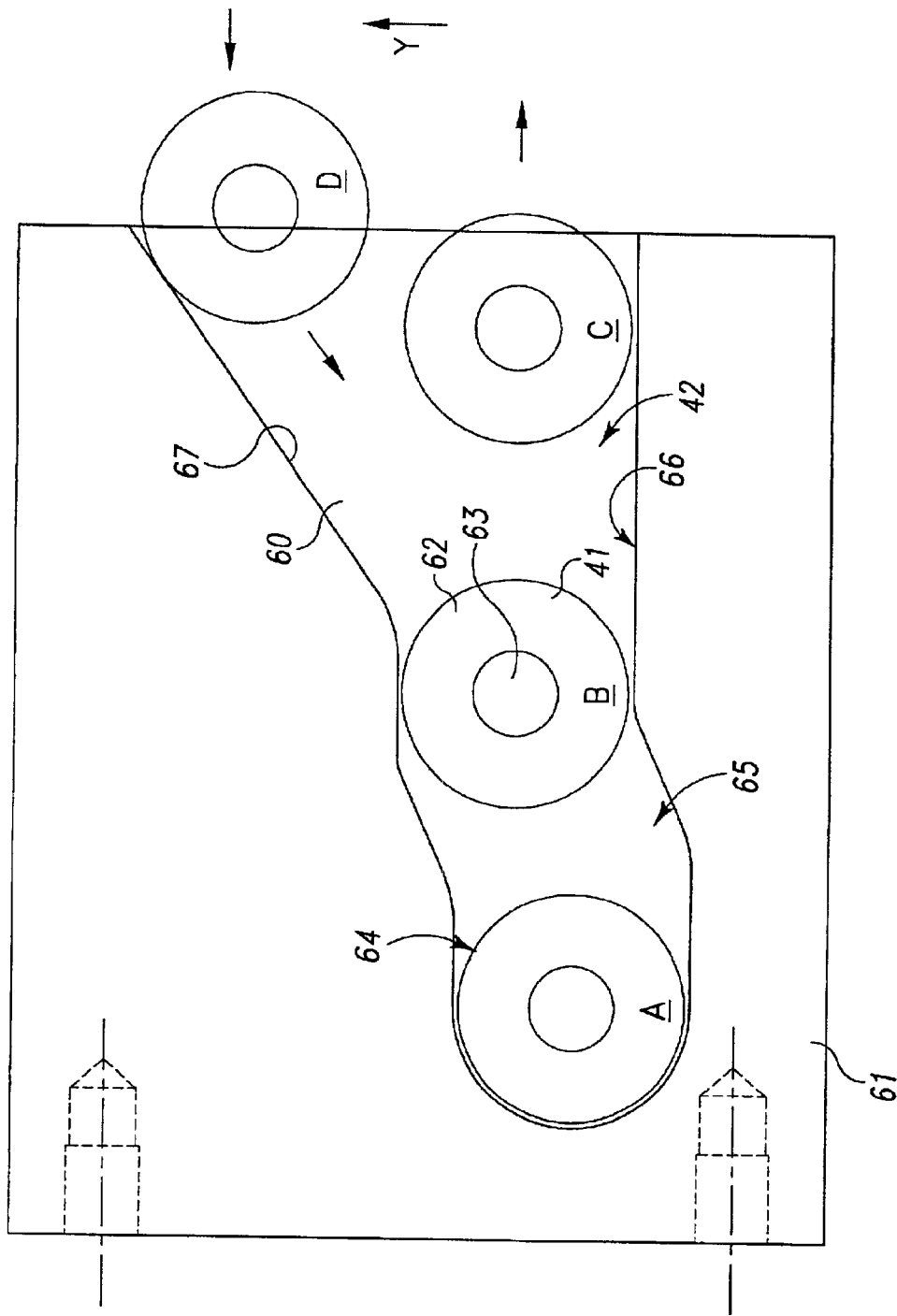
FIG. 4 is a side elevation view of a guide including a cam track of the present invention.

As indicated earlier, a first means for moving the beams is a cam follower 41 fixed to each end of each beam 40. The cam followers 41 can be rollers or slides that are designed for interaction with a cam track 42 that is fixed to the second mold portion 12. In the context of the present invention, a preferred cam track 42 is shown in FIG. 4. It will be appreciated that the cam tracks 42 on opposite ends of the same beam 40 must be mirror images of each other and similarly situated with respect to the beam 40 if stress and torque on the beam 40 are to be minimized. It will also be appreciated that the illustrated cam track 42 shown in FIG. 4 would necessarily be suitably reproduced in mirror image to correctly interact with the opposite ends of the beam 40. The following discussion of the structure of the cam track 42 and the movement of the beam in association therewith reflects this mirror image construction of the two cam tracks located at opposite ends of the beam 40. The cam follower 41 is shown in FIG. 4 to consist of a roller 62 mounted on a spindle 63 that projects from and is secured to the end of the beam 40. The cam follower 41 is shown in four different locations indicating different positions that the cam follower 41 is likely to occupy during movement of the beam 40 in accordance with this invention.

The cam track 42 comprises essentially a shaped groove 60 in a suitably dimensioned block 61 that includes a first portion 64 that receives the cam follower 41 when the mold portions 11, 12 and 18 are in the closed position. This location is designated in FIG. 4 by the cam follower 41 at position A. The cam track 42 includes a ramp portion 65 between the first portion 64 and a second portion 66. As the second and third mold portions move apart from each other, the cam follower 41 moves from position A to position B traversing the ramp portion 65, which causes the beam 40 to move slightly away from block 33, and correspondingly causes the space defining surfaces 22a and 22b to separate only by a distance sufficient to permit the molded articles 21 to be loosely held but not released by the space defining surfaces. The second portion 66 of the cam track 41 is structured so that the cam follower 41 can move, to the right as shown in FIG. 4, through position C completely outside the end of the cam track 41. This freedom of movement allows the third mold portion to travel toward the molded article receiver 22 by what ever distance is required to safely deposit the molded articles into the tubes 20 of the article receiver 22.

Once the molded articles are delivered to the article receiver 22, a sensor of the relative position of the third mold portion 18 and the article receiver 22 causes the power operator 44 coupled to the beam 40 to actuate thus causing movement of the beam 40 and the cam followers 41 coupled thereto to move in direction Y as shown in FIG. 4, thereby releasing the molded articles 21 from the space defining surfaces 22a, 22b. The third mold portion is then caused to move back toward the second mold portion until the cam followers 41 reenter the cam track 42. When the second and third mold portions 12 and 18 are within a pre-selected distance of each other, the cam follower 41 comes into position D and engages the cam track. As the second and third mold portions 12 and 18 come closer together, the cam follower 41 interacting with a surface 67 of the cam track 42 causes relative movement of each pair of space defining surfaces 22a, 22b back toward each other until the cam follower 41 re-enters the first portion 64 of the cam track. This closing motion of the third mold portion 18 toward the second 12 provides sufficient space for the molded article receiver 22 to exit the gap 17. The mold portions 11, 12, and 18 then return to the fully closed position to permit the subsequent injection of plastic to from another set of molded articles.

Figure 5:
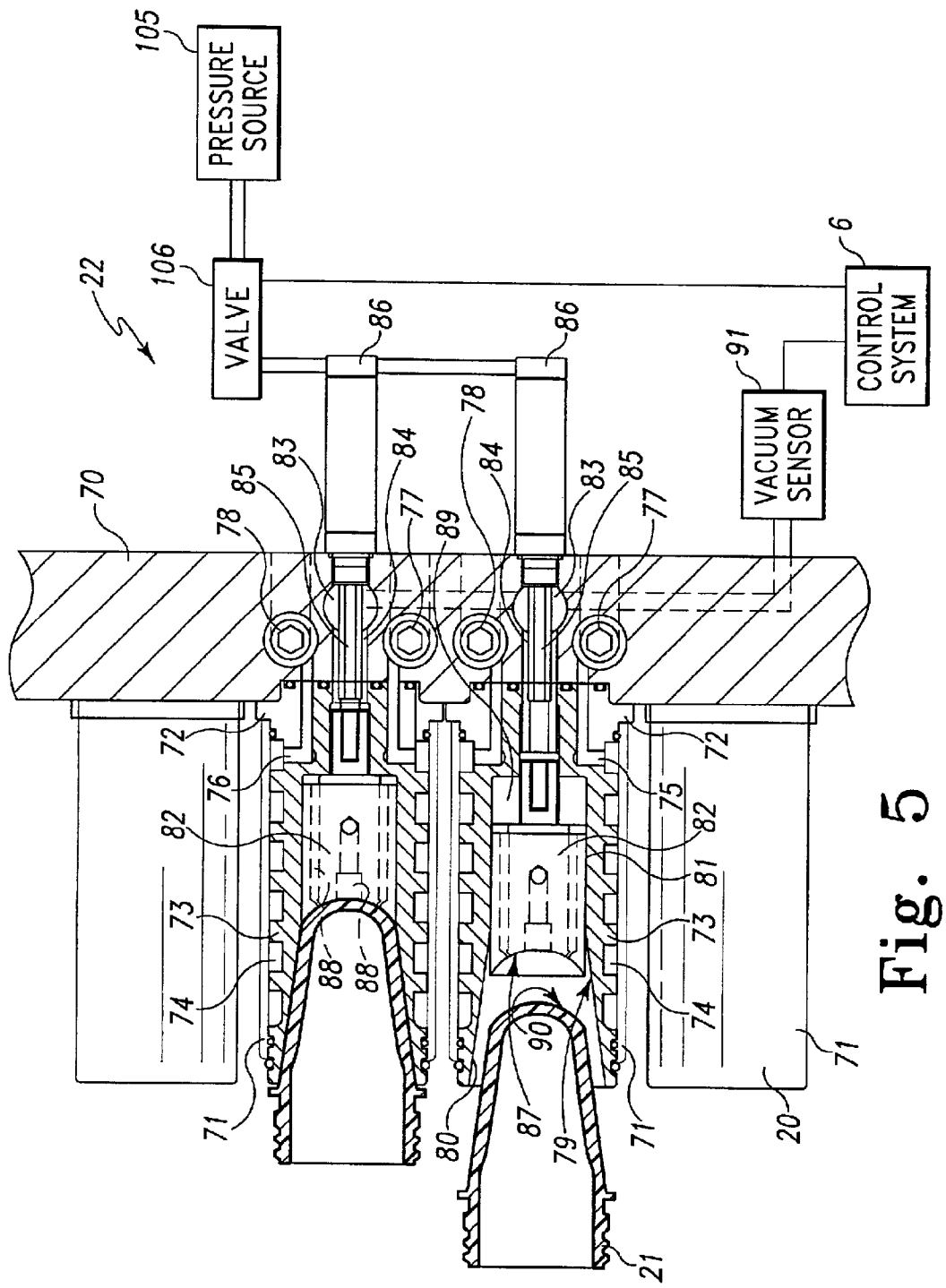
FIG. 5 is a partial sectional view of a molded article receiver of the present invention showing a surface contact element and molded article.

A detailed look at a preferred molded article receiver 22 is given by FIG. 5. The molded article receiver 22 comprises a support plate 70 to which a plurality of tube-like molded article article receiver tubes 20 are attached. The support plate 70 is preferably made of a lightweight material such as 6061-T6 aluminum, or an engineering plastic such a ACETRON GP™, manufactured by Polymer Corporation, Reading, Pa., so that the molded article receiver as a whole has as low inertia as possible. Each of the individual article receiver tubes 20 has a sleeve 71 fixed to the frame 70 by base mounting 72. A sleeve insert 73 is received within the sleeve 71 and base mounting 72. A space between the sleeve 71 and the sleeve insert 73 defines a channel 74 for receiving liquid that has been thermally adjusted to a temperature selected to thermally modify or treat the molded articles 21. The channel 74 includes both an inlet 75 and an outlet 76 that are coupled to liquid supply channel 77 and liquid drain channel 78, respectively, which are located in frame 70. An inner surface 79 of each sleeve insert 73 has a distal portion 80 that is configured to generally reflect or match an exterior surface portion of the molded articles 21. A proximal portion 81 of each sleeve insert 73 is generally cylindrical and dimensioned to receive a movable surface contact element 82 for reciprocal movement within the generally cylindrical portion 81. The sleeve inserts 73 and the contact elements 82 are preferable made of highly thermally conductive material to maximize the thermal transfer between any molded article 21 received within the sleeve insert 73 and the liquid located in channel 74.

In addition to liquid channels 77 and 78, the frame 70 also includes a vacuum duct 83, which is coupled to a vacuum source, not shown, and to the interior of sleeve insert 73 by way of a channel 84. The channel 84 also provides a pathway for a stem 85 coupling the contact element 82 to an air or gas spring 86. A distal surface 87 of the contact element 82 is generally configured to reflect or match a portion of an exterior surface 90 of the molded articles 21. The contact element 82 also includes a plurality of openings 88 through which, in the absence of a molded article 21, air is drawn into the vacuum duct 83 through a space 89, located between the contact element 82 and the bottom of the sleeve insert 73, and channel 84. As the molded article 21 contacts the distal surface 87 of the contact element 82, the matching shape of the distal surface 87 and the molded article 21 restricts the flow of air through the openings 88. The restricted air flow causes the vacuum in duct 83 to harden. The hardening of the vacuum in duct 83 can be sensed by a vacuum/pressure sensor, schematically shown as sensor 91. The restricted air flow caused by the contact of the molded articles 21 and distal surfaces 87 also causes a pressure differential between the inside of the molded article 21 and space 89 below the contact element 82 that biases the contact element 82 to the right against the pressure exerted by the air or gas spring 86.

The fluid pressure supplied to the gas or air spring 86 can be controlled by valve 106 coupled between a source of gas or air pressure 105 and all or some portion of the air springs 86. The valve can be, in turn, coupled to the control system 6 of the injection molding machine 10 or to other independent controls for the apparatus 22. In the absence of any molded article 21, or with the molded article 21 spaced from the distal surface 87 of the contact element 82, the fluid pressure supplied to the spring 86 exerts sufficient force to maintain the contact element 82 in an extended position as shown in the lower portion of FIG. 5. When the fluid pressure to springs 86 is reduced, the pressure differential developed across the molded article 21 and contact element 82 is sufficient to move the contact element 82 and molded article 21 to the right, as shown in the top of FIG. 5. However, this movement can only happen if the molded articles 21 are not restrained by the space defining surfaces 22a, and 22b. It will be appreciated that the contact between the distal surfaces 87 of the contact elements 82 and the surfaces 90 of all of the molded articles 21 generally occurs nearly simultaneously, or over such a short period of time, so that the change in pressure sensed by vacuum sensor 91 occurs over a similarly short period of time. This change in pressure can be used to trigger power operator 44 to move the beam 40, and the coupled slides 25 or 26 relative to the third mold portion 18 so as to fully release the molded articles 21 from the space defining surfaces 22a, 22b. With the molded articles 21 fully released, the motion between the top and bottom of FIG. 5 quickly follows, thus transferring the molded articles 21 from the space defining surface 22a, 22b of the third mold portion 18 to the molded article receiver 22. The change in pressure sensed by vacuum sensor 91 can also be used to restrict the flow of air or other gas through valve 106 to the air springs 86, thus ensuring retention of the molded articles 21 within the sleeve inserts 73. This coordination of the restriction of pressure through valve 106 and the opening of the space defining surfaces 22a, 22b can also be done with a coordinated timing circuit and the system control 6, or in other equivalent manners as will be apparent to those skilled in the art.

Once the molded articles 21 have been retained in the molded article retrieval apparatus 22 for sufficient time to achieve the desired thermal modification, the molded articles 21 can be released. This is achieved by reducing or eliminating the vacuum being supplied to vacuum duct 83 coupled with the supply of air or other gas to gas springs 86 in sufficient amount to rapidly move the contact elements 82 to the left as shown in FIG. 5, thereby ejecting the molded articles 21 from the article receiver 22. If desired, each gas spring 86 can be monitored to make sure that the desired motion has taken place, and that no motion takes place when the vacuum is reapplied to vacuum duct 83, thus signifying that to molded article 21 has been retained by the article receiver 22.

A particularly desirable surface contact element 82 is shown in FIGS. 6A through 6D. FIG. 6A is a front elevation view of the distal surface 87 of the contact element shown in FIG. 5. FIG. 6B is a sectional view of a contact element 82 taken along line B—B of FIG. 6A, and is similar to the sectional view shown in FIG. 5. FIG. 6C is a section view of the same contact element 82 taken along line C—C of FIG. 6A. FIG. 6D is a back elevation view of the contact element 82. From these four views, it will be seen that the contact element has a generally concave distal surface 87, the curvature of which is dictated by the shape of the corresponding molded articles 21 with which the contact element is to be employed. The contact element 82 has an outer cylindrical surface 92 that is substantially identical in dimension to the interior dimension of the proximal portion 81 of sleeve insert 73, so that a smooth linear motion of the contact element 82 within the sleeve insert 73 can be obtained. The cylindrical surface 92 extends from the distal surface 87 to a first proximal surface 93, which is ring-like and contains two sets of openings 94 and 95. A step 96 is provided in a central portion of proximal surface 93, which contacts a rear surface of sleeve insert 73 when the contact element 82 is in the rearward position shown in the upper portion of FIG. 5. A stem connection 97 projects rearwardly from the step 96 and includes a threaded opening 98 for coupling with stem 85 of gas spring 86. The openings 94 are inwardly inclined as shown in FIG. 6B to intercept axial channel 99 which extends forward to an enlarged portion 101 intercepting an axial portion of distal surface 87. The openings 95 extending longitudinally through the contact element 82 from the proximal surface 93 to a location adjacent to distal surface 87, where short openings 100 provide peripheral access to the distal surface 87. The enlarged portion 101 of the axial channel 99 is preferably faceted to accept a suitable tool to facilitate engagement between the threaded opening 98 for coupling with stem 85 of gas spring 86. An inner portion of axial channel 99 is threaded to permit insertion of a plug to help maintain a vacuum when a selected portion of the apparatus is not being used.

While the present invention has been described in detail with reference to the accompanying drawings showing a preferred embodiment of the invention, variations and modifications exist within the scope and spirit of the invention as described and as defined in the following claims.

What is claimed is:

1. A method for releasing molded articles from a mold, the mold having a first mold portion, a second mold portion movable with respect to the first mold portion, and a third mold portion movably interposed between the first and second portions and having at least one pair of space defining surfaces which together with the first and second mold portions defines in a closed position at least one space for receiving plastic material injected therein to form at least one molded article, the second and the third mold portions being movable away from the first mold portion to permit removal of the at least one molded article from the first mold portion, the second mold portion being movable away from the third mold portion to remove the at least one molded article from the second mold portion; the method comprising the steps of:

providing a guide coupled to the second mold portion forming a cam track;

providing a cam follower coupled to the at least one pair of space defining surfaces of the third mold portion;

engaging the cam follower in the cam track at least when the second and third mold portions are within a pre-selected distance of each other, the cam follower interacting with the cam track to cause relative movement of each pair of space defining surfaces, the cam follower being engaged in a first portion of the cam track when the mold portions are in the closed position;

moving the cam follower to a second portion of the cam track including a ramp defining a pre-release position of each pair of space defining surfaces so that the at least one molded article is loosely retained by the space defining surfaces; and providing a signal to a power operator carried by the third mold portion and coupled to the space defining surfaces, the signal causing the power operator to move each pair of space defining surfaces from the pre-release position to a full release position for releasing the molded article from the third mold portion.

2. A method for releasing molded articles from a mold into a molded article receiver, the mold having a first mold portion, a second mold portion movable with respect to the first mold portion, and a third mold portion movably interposed between the first and second portions and having at least one pair of space defining surfaces which together with the first and second mold portions defines in a closed position at least one space for receiving plastic material injected therein to form at least one molded article, the second and the third mold portions being movable away from the first mold portion to permit removal of the at least one molded article from the first mold portion, the second mold portion being movable away from the third mold portion to remove the at least one molded article from the second mold portion; the method comprising the steps of:

providing a guide coupled to the second mold portion forming a cam track;

providing a cam follower coupled to the at least one pair of space defining surfaces of the third mold portion;

engaging the cam follower in the cam track at least when the second and third mold portions are within a pre-selected distance of each other, the cam follower interacting with the cam track to cause relative movement of each pair of space defining surfaces, the cam follower being engaged in a first portion of the cam track when the mold portions are in the closed position;

moving the molded article receiver in between the first and second mold portions and into proximity with the third mold portion;

moving the third mold toward the molded article receiver so that the cam follower moves to a second portion of the cam track including a ramp defining a pre-release position of each pair of space defining surfaces wherein the at least one molded article is loosely retained by the space defining surfaces; and providing a signal from the molded article receiver to a power operator carried by the third mold portion and coupled to the space defining surfaces, the signal causing the power operator to move each pair of space defining surfaces from the pre-release position to a full release position for releasing the molded article from the third mold portion into the olded article receiver.

3. The method of claim 2 further comprising the steps of providing the molded article receiver with at least one corresponding receiver tube alignable with each pair of space defining surfaces for receiving the at least one molded article, and providing at least one sensor for detecting any deposition of a molded articles into a receiver tube, the sensor being coupled to a signal source for sending said signal to said power operator.

4. The method of claim 3 further comprising the steps of providing within each receiver tube an open forward end configured to receive a molded article, a closed rearward end including a surface contact element movably situated with respect to the forward end and configured to conform to a portion of the surface of the molded article, and an air cylinder coupled to the surface contact element, and providing sufficient air pressure to the air cylinder to bias the surface contact element toward the open forward end of the receiver tube.

5. The method of claim 4 further comprising the steps of coupling the closed rearward end of the receiver tube to a source of vacuum, the vacuum being insufficient to overcome the bias provided to the surface contact element by the air pressure within the air cylinder when no molded article is present within the receiver tube, and using the vacuum to assist in locating a molded article within the receiver tube in contact with the surface contact element.

6. The method of claim 5 further comprising the steps of:

providing said signal from the molded article receiver to said power operator to cause movement of each pair of space defining surfaces from the pre-release position to a full release position only after the molded article is in contact with the surface contact element restricting the supply of air pressure within the air cylinder , and allowing the vacuum to displace the surface contact element and molded article toward the receiver tube closed end thus uncoupling the molded article from the third mold portion.

7. The method of any of claims 4 to 6 further comprising the steps of:

withdrawing the molded article receiver from between the first and second mold portions, and providing the air cylinder with sufficient air pressure to displace the surface contact element toward the open end with sufficient speed to eject the molded article from the receiver tube.

8. The method of any of claims 1 to 6 further comprising the steps of:
providing said guide with a first end containing the first portion of the cam track, a second end including the second portion, and an opening in the second end, and
moving the cam follower through the opening and outside the cam track prior to providing said signal to said power operator carried by the third mold portion that causes the power operator to move each pair of space defining surfaces from the pre-release position to a full release position.

9. The method of claim 8 further comprising the steps of
moving the third mold portion toward the second mold portion subsequent to release of each molded article from each pair of space defining surfaces so that the cam follower re-enters the cam track and
providing the guide with an inclined surface adapted to contact the cam follower as the third mold portion moves from the full release position toward the second mold portion for returning the space defining surfaces to a closed position.

10. A guide for use in controlling the relative position of at least one pair of space defining surfaces which, together with a first and second mold portions, defines in a closed position at least one space for receiving plastic material injected therein to form at least one molded article, the guide comprising:
a first portion having a closed end and including a pair of sides defining a cam track, the sides in the first portion being spaced sufficiently from each other to accommodate a cam follower when the mold portions are in the closed position, the first portion also including a ramp leading to an intermediate portion, the intermediate portion defining a pre-release position for each pair of space defining surfaces so that the at least one molded article is loosely retained by the space defining surfaces, one of the sides in the intermediate portion being inclined away from the other side toward a second portion including a second portion including an open end so that the cam follower can move outside the space between the sides of the cam track, the inclined away surface being adapted to contact the cam follower as the third mold portion moves from the full release position toward the second mold portion for returning the space defining surfaces to a closed position.

11. An article molding assembly including a mold and a release mechanism for releasing molded articles from the mold, the mold including a first mold portion, a second mold portion movable with respect to the first mold portion, and a third mold portion movably interposed between the first and second portions and having at least one pair of space defining surfaces which together with the first and second mold portions defines in a closed position at least one space for receiving plastic material injected therein to form at least one molded article, the second and the third mold portions being movable away from the first mold portion to permit removal of the at least one molded article from the first mold portion, the second mold portion being movable away from the third mold portion to remove the at least one molded article from the second mold portion, the release mechanism operating to release the at least one molded article from the third mold portion and comprising:
a guide coupled to the second mold portion forming a cam track;
a cam follower coupled to the at least one pair of space defining surfaces of the third mold portion and engaged in the cam track at least when the second and third mold portions are within a pre-selected distance of each other, the cam follower interacting with the cam track to cause relative movement of each pair of space defining surfaces, the cam follower being engaged in a first portion of the cam track when the mold portions are in the closed position, the first portion of the cam track also including a ramp to an intermediate portion defining a pre-release position of each pair of space defining surfaces so that the at least one molded article is loosely retained by the space defining surfaces; and
a power operator carried by the third mold portion and coupled to the space defining surfaces, the power operator being responsive to a signal to move each pair of space defining surfaces from the pre-release position to a full release position.

12. An article molding assembly including a mold, a molded article receiver for receiving molded articles from the mold, and a release mechanism for releasing molded articles from the mold, the mold having a first mold portion, a second mold portion movable with respect to the first mold portion, and a third mold portion movably interposed between the first and second portions and having at least one pair of space defining surfaces which together with the first and second mold portions defines in a closed position at least one space for receiving plastic material injected therein to form at least one molded article, the second and the third mold portions being movable away from the first mold portion to permit removal of the at least one molded article from the first mold portion, the second mold portion being movable away from the third mold portion to remove the at least one molded article from the second mold portion, the release mechanism comprising:
a guide coupled to the second mold portion forming a cam track;
a cam follower coupled to the at least one pair of space defining surfaces of the third mold portion and engaged in the cam track at least when the second and third mold portions are within a pre-selected distance of each other, the cam follower interacting with the cam track to cause relative movement of each pair of space defining surfaces, the cam follower being engaged in a first portion of the cam track when the mold portions are in the closed position, the first portion of the cam track also including a ramp to a second portion, the second portion defining a pre-release position of each pair of space defining surfaces so that the at least one molded article is loosely retained by the space defining surfaces; and
a power operator carried by the third mold portion and coupled to the space defining surfaces, the power operator being responsive to a signal indicating the relative position of the third mold portion and said molded article receiver to move each pair of space defining surfaces from the pre-release position to a full release position.

13. The article molding assembly of either of claims 11 or 12 wherein the guide includes a first end containing the first portion of the cam track and a second end including the second portion, the second end having an opening so that the cam follower can move outside the cam track.

14. The article molding assembly of either of claims 11 or 12 wherein the guide includes an inclined surface adapted to contact the cam follower as the third mold portion moves from the full release position toward the second mold portion for returning the space defining surfaces to a closed position.

15. The article molding assembly of either of claims 11 or 12 wherein the power operator comprises a fluid operated apparatus.

16. The article molding assembly of claim 15 wherein the fluid operated apparatus comprises an air cylinder operable at least in one direction to move the space defining surfaces to the full release position.

17. The article molding assembly of claim 12 wherein said molded article receiver includes at least one corresponding receiver tube alignable with each pair of space defining surfaces for receiving the at least one molded article, and at least one sensor for detecting any deposition of a molded articles into a receiver tube, the sensor being coupled to a signal source for sending said signal to said power operator.

18. The article molding assembly of claim 17 wherein each receiver tube comprises an open forward end configured to receive a molded article, a closed rearward end including a surface contact element movably situated with respect to the forward end and configured to conform to a portion of the surface of the molded article, a vacuum duct coupling the closed rearward end to a source of vacuum for assisting in the retention of a molded article within the receiver tube, an air cylinder coupled to the surface contact element, and a pressure duct coupling each air cylinder to a source of air pressure for controlling the position of the surface contact element with respect to the forward end.

19. The article molding assembly of claim 18 wherein each surface contact element further comprises a stem connection portion projecting rearwardly including a threaded opening for connection to said air cylinder.

* * * * *